(12) United States Patent
Steinebach

(10) Patent No.: US 6,872,005 B2
(45) Date of Patent: Mar. 29, 2005

(54) SNAP-IN BEARING END CAP

(75) Inventor: Christopher L. Steinebach, Indianapolis, IN (US)

(73) Assignee: Rexnord Industries, Inc., Milwaukee, WI (US)

( * ) Notice: Subject to any disclaimer, the term of this patent is extended or adjusted under 35 U.S.C. 154(b) by 36 days.

(21) Appl. No.: 10/247,447

(22) Filed: Sep. 19, 2002

(65) Prior Publication Data
US 2003/0103701 A1 Jun. 5, 2003

Related U.S. Application Data
(60) Provisional application No. 60/336,710, filed on Dec. 5, 2001.

(51) Int. Cl.$^7$ .............................. F16C 33/76
(52) U.S. Cl. ................................... 384/489
(58) Field of Search ...................... 384/477, 489

(56) References Cited

U.S. PATENT DOCUMENTS

| | | | |
|---|---|---|---|
| 3,813,104 A | * 5/1974 | Smith | 277/376 |
| 4,342,490 A | * 8/1982 | Swinley | 384/489 |
| 5,380,103 A | 1/1995 | Lederman | 384/489 |
| 5,678,934 A | 10/1997 | Fischer et al. | 384/489 |
| 5,711,617 A | * 1/1998 | Scheller | 384/484 |
| 5,947,612 A | * 9/1999 | Dennison Buck et al. | 384/536 |
| 6,428,213 B1 | * 8/2002 | Parejko et al. | 384/489 |

FOREIGN PATENT DOCUMENTS

| | | | |
|---|---|---|---|
| DE | 199 29 536 | 1/2001 | F16C/35/06 |
| EP | 0 694 703 | 1/1996 | F16C/33/76 |
| EP | 0 778 423 | 6/1997 | F16C/33/76 |
| EP | 0 887 568 | 12/1998 | F16C/33/76 |
| GB | 1 205 886 | 9/1970 | F16C/33/72 |
| GB | 2 058 241 | 4/1981 | F16C/35/04 |

* cited by examiner

Primary Examiner—Thomas R. Hannon
(74) Attorney, Agent, or Firm—Quarles & Brady LLP

(57) ABSTRACT

A bearing assembly including a housing and a radial groove formed in the housing. An end cap having at least three radially extending tabs which engage the groove to fix the end cap relative to the housing. Preferably, the end cap and tabs are formed from a flexible and resilient material.

17 Claims, 2 Drawing Sheets

SNAP-IN BEARING END CAP

CROSS REFERENCES TO RELATED APPLICATIONS

This application claims the priority benefit of U.S. Provisional Patent Application No. 60/336,710 filed on Dec. 5, 2001.

STATEMENT REGARDING FEDERALLY SPONSORED RESEARCH

Not Applicable

BACKGROUND OF THE INVENTION

The field of invention is bearing assemblies, and more particularly to a bearing assembly including a snap-in bearing end cap.

Conventional end caps or end closures are spun steel or molded plastic. The steel end caps are pressed into a counter bore within the housing and utilize an interference fit to attach the end cap to the housing. Plastic end caps typically utilize barbed projections that are pressed into load slots or straps that are attached to a lube fitting to attach the end cap to the housing. It is likely the former will be dislodged by side impacts and the latter will move out of position if brushed or bumped.

Plastic bearing end caps, such as disclosed in Great Britain Patent Application No. 2,058,241 A and U.S. Pat. No. 5,678,934, include diametrically opposed tabs which are received in slots formed in the housing. The tabs allow the caps to be snap-fit into the housing. Unfortunately, as discussed above, the plastic caps are easily dislodged by side impacts.

BRIEF SUMMARY OF THE INVENTION

The present invention provides a bearing assembly including a housing and a radial groove formed in the housing. An end cap having at least three radially extending tab engages the groove to fix the end cap relative to the housing. Preferably, the end cap is formed from a flexible and resilient material. Advantageously, the tabs can retain the cap relative to the housing even when subjected to a side impact which could dislodge a prior art cap.

A general objective of the present invention is to provide an end cap that is securely attached to a bearing housing to enclose moving parts associated with the bearing and or a shaft. This objective is accomplished by providing an end cap having at least three tabs extending radially from the end cap which engages a groove formed in the ball bearing housing.

Another objective of the present invention is to provide a bearing having and end cap which is resistant to the impacts and bumps that occur during normal use. This objective is accomplished by forming the end cap from a flexible and resilient material.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
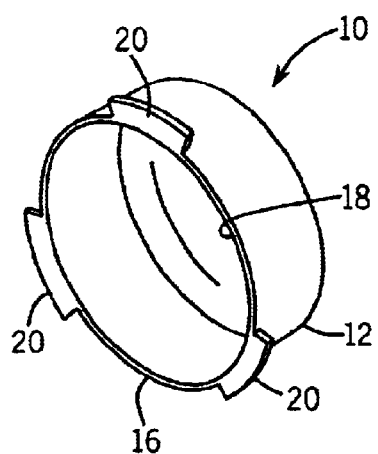
FIG. 1 is a bottom perspective view of a bearing end cap incorporating the present invention.
Figure 2:
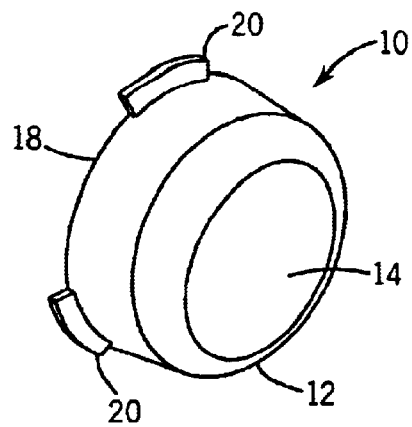
FIG. 2 is a top perspective view of the end cap of FIG. 1.

As shown in FIGS. 1–5, an end cap 10 for use with a bearing housing 24 includes a cup-shaped body 12 having a top 14 and an open bottom 16. The open bottom is defined by a circumferential edge 18. Tabs 20 extending radially from the edge 18 are received in a groove 22 formed in a bearing housing 24 to fix the cap 10 to the housing 24.

The end cap body 12 is preferably formed from a flexible, resilient material, such as any crystalline polymer material including ABS, Delrin, and polypropylene. Preferably, the material is polypropylene because of the flexible and resilient characteristics of the material. Most preferably, the end cap 10 is symmetrical about a central axis 26, and the circumferential edge 18 is equidistant from the axis 26.

Three tabs 20 are received in the groove 22 formed in the housing 24, and extend radially outwardly from the circumferential edge 18 for engagement with the inwardly opening groove 22 formed in the housing 24. Of course, the tabs 20 could be formed to extend radially inwardly for engagement with an outwardly opening groove formed in a housing without departing from the scope of the invention. Advantageously, three tabs engaging the groove have been shown by the inventor to retain the end cap relative to the housing better than the prior art end caps having two tabs. Although three equally spaced tabs 20 are shown, more than three tabs can be used which are, or are not, equally spaced without departing from the scope of the invention.

Figure 5:
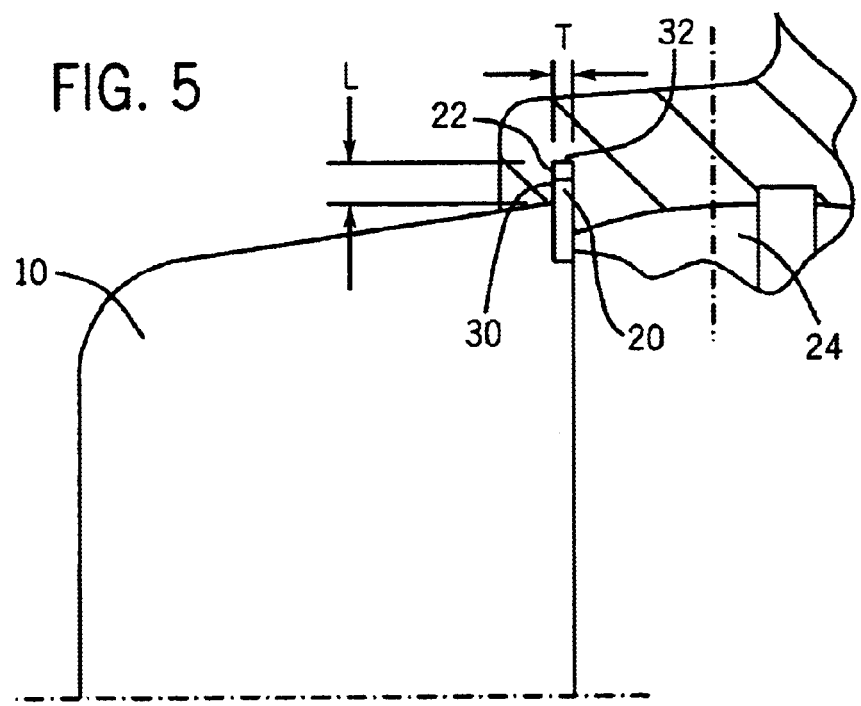
FIG. 5 is a detailed view of the tab engaged in the groove of FIG. 4.

As shown in FIG. 5, each tab 20 has a thickness T and an engagement portion 30. The engagement portion 30 has a length L which extends radially inwardly from the radially outer edge 32 of the tab 20. The cap 10 is less likely to be dislodged by impacts compared to prior art end caps if the length L of each tab 20 is approximately 2.2 times the tab thickness T. A radial engagement length L of less than approximately 1.7 times the tab thickness T does not provide sufficient engagement to significantly improve securing the cap 10 to the housing 4. In addition, providing an end cap 10 having a radial engagement length L greater than approximately 3.0 times the tab thickness T can increase the difficulty of snapping the cap 10 into engagement with the housing groove 22 while inefficiently increasing the material content of the cap 10.

Referring back to FIGS. 1–5, preferably, the tabs 20 are formed as an integral part of the body 12 from the same material as the body 12 using methods known in the art, such as molding, to provide flexible, resilient tabs which are easily fabricated. Advantageously, forming the tabs 20 using a flexible and resilient material facilitates installation by allowing the tabs 20 to be snapped into a radial groove 22 formed in the housing 24 to hold the cap 10 in position.

The housing 24 is a conventional bearing housing having an annular hub 28 defining an opening which can receive a rotatable shaft or other bearing parts. The inwardly opening radial groove 22 is formed in the hub 28. Although a housing having an annular hub is disclosed, the housing can be provided without a hub, such as a pillow block, and the radial groove can be formed directly in the housing, such as in an internal wall of the opening, without departing from the scope of the present invention. Moreover, the groove 22 can be discontinuous forming individual receptacles, wherein each receptacle receives one or more of the tabs 20 without departing from the scope of the invention.

Figure 3:
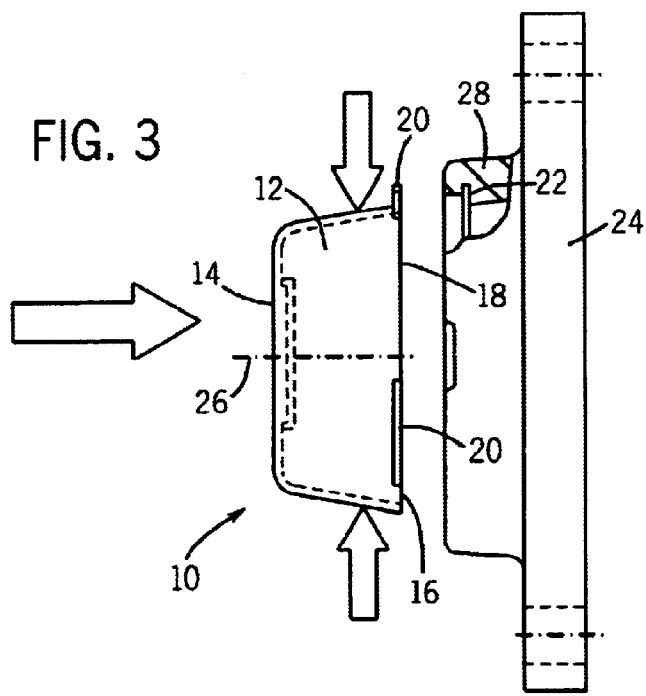
FIG. 3 is a an exploded sectional view of a bearing assembly incorporating the present invention.
Figure 4:
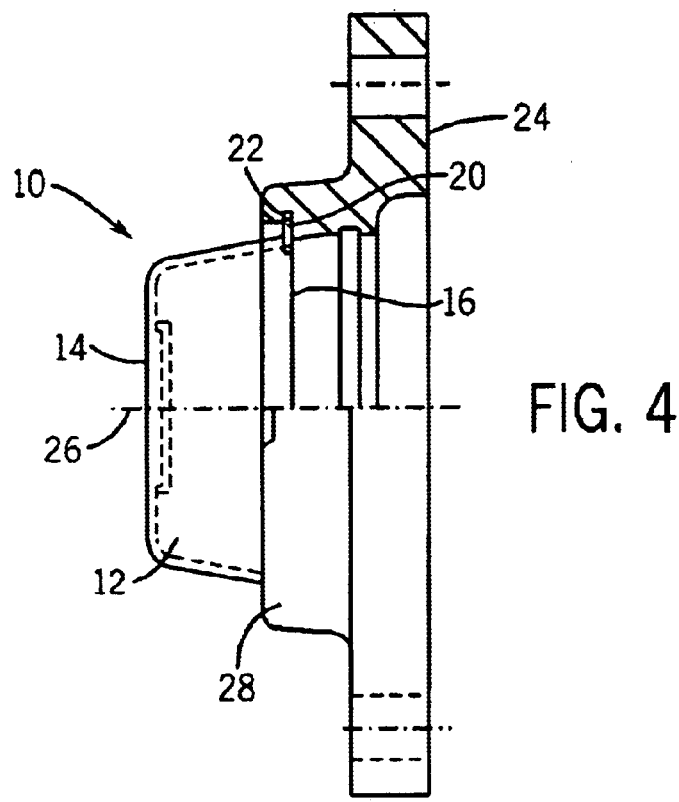
FIG. 4 is a sectional view of the bearing assembly of FIG. 3.

In use, installation of the tabs 20 is accomplished without tools by depressing, compressing the body 12, as shown by the arrows in FIG. 3, such as by using an installer's fingers, while pushing the cap 10 axially into the annular hub 28 until the tabs 20 snap into the groove 22. Alternatively, one or more tabs 20 can be inserted into the groove 22, and the body 12 or remaining tabs 20 can be deformed such that the remaining tabs 20 snap into the groove 22. Advantageously, the tabs 20 can engage the radial groove 22 in a manner that is unlikely to be dislodged by bumps or impacts.

While there have been shown and described what is at present considered the preferred embodiments of the invention, it will be obvious to those skilled in the art that various changes and modifications can be made therein without departing from the scope of the invention defined by the appended claims.

I claim:

1. A bearing assembly comprising:
   a housing;
   a radial groove formed in said housing;
   an end cap having at least three radially extending tabs engaging said groove to fix said end cap relative to said housing, each of said tabs having a thickness and a radial engagement portion, said radial engagement portion being in engagement with said groove and having a length extending radially inwardly from an outer edge of each tab, wherein said radial engagement length is no less than 1.7 and no more than 3.0 times the thickness of said tab.

2. The bearing assembly as in claim 1, in which said groove opens radially inwardly, and said at least three tabs extend radially outwardly.

3. The bearing assembly as in claim 1, in which said at least three tabs are formed from a flexible, resilient material.

4. The bearing assembly as in claim 1, in which said at least three tabs are formed as an integral part of said end cap.

5. The bearing assembly as in claim 1, in which said housing defines an opening, and said end cap covers said opening.

6. The bearing assembly as in claim 1, in which said housing includes a hub, and said radial groove is formed in said hub.

7. The bearing assembly as in claim 1, in which said radial groove is continuous.

8. The bearing assembly as in claim 1, in which said radial engagement length is approximately 2.2 times the thickness of said tab.

9. An end cap for use with a housing having a radial groove, said end cap comprising:
   a body having circumferential edge; and
   at least three tabs extending radially from said circumferential edge, wherein said at least three tabs are engageable with the radial groove to fix the end cap relative to the housing, each of said tabs have a thickness and a radial engagement portion, said radial engagement portion being engageable with said groove and having a length extending radially inwardly from an outer edge of each tab, wherein the radial engagement length is no less than 1.7 and no more than 3.0 times the thickness of said tab.

10. The end cap as in claim 9, in which said radial engagement length is approximately 2.2 times the thickness of said tab.

11. A bearing assembly comprising:
    a housing;
    an inwardly opening radial groove formed in said housing;
    an end cap having a body including a circumferential edge and at least three tabs extending radially outwardly from said circumferential edge into said radial groove, wherein each of said tabs have a thickness and a radial engagement portion, said radial engagement portion engaging said groove and having a length extending radially inwardly from an outer edge of each tab, wherein the radial engagement length is no less than 1.7 and no more than 3.0 times the thickness of said tab.

12. The bearing assembly as in claim 11, in which said radial engagement length is approximately 2.2 times the thickness of said tab.

13. The bearing assembly as in claim 11, in which said at least three tabs are formed from a flexible, resilient material.

14. The bearing assembly as in claim 11, in which said at least three tabs are formed as an integral part of said end cap.

15. The bearing assembly as in claim 11, in which said housing defines an opening, and said end cap covers said opening.

16. The bearing assembly as in claim 11, in which said housing includes a hub, and said radial groove is formed in said hub.

17. The bearing assembly as in claim 11, in which said radial groove is continuous.

* * * * *